(12) United States Patent
Wang et al.

(10) Patent No.: US 12,287,720 B2
(45) Date of Patent: Apr. 29, 2025

(54) DISPLAYING DEVICE-USAGE INFORMATION

(71) Applicant: Samsung Electronics Co., Ltd., Suwon-si (KR)

(72) Inventors: Anqi Wang, Shanghai (CN); Ji Yeon Han, Fairview, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 17/879,246

(22) Filed: Aug. 2, 2022

(65) Prior Publication Data

US 2024/0045783 A1    Feb. 8, 2024

(51) Int. Cl.
 *G06F 3/048*     (2013.01)
 *G06F 3/04845*   (2022.01)
 *G06F 11/34*     (2006.01)
 *G06F 21/84*     (2013.01)

(52) U.S. Cl.
 CPC ...... *G06F 11/3438* (2013.01); *G06F 3/04845* (2013.01); *G06F 21/84* (2013.01); *G06F 2221/2149* (2013.01)

(58) Field of Classification Search
 CPC ... G06F 11/3438; G06F 3/04845; G06F 21/84
 See application file for complete search history.

(56) References Cited

U.S. PATENT DOCUMENTS

| | | | |
|---|---|---|---|
| 10,165,108 B1* | 12/2018 | Douglas | G06Q 30/0262 |
| 11,044,392 B2 | 6/2021 | Ise | |
| 11,823,603 B2* | 11/2023 | Chen | G06F 3/0481 |
| 11,893,201 B2* | 2/2024 | Zhang | G06F 3/0481 |
| 11,909,906 B2* | 2/2024 | Zhu | H04W 68/005 |
| 12,045,536 B2* | 7/2024 | Zhang | G06F 1/3231 |
| 2013/0067376 A1 | 3/2013 | Kim | |
| 2015/0195789 A1* | 7/2015 | Yoon | H04M 1/724631 345/173 |
| 2017/0277361 A1* | 9/2017 | Schulze | G06F 3/0484 |
| 2018/0121060 A1* | 5/2018 | Jeong | G06F 9/44505 |
| 2018/0359349 A1* | 12/2018 | Graylin | G10L 15/1815 |
| 2020/0127960 A1 | 4/2020 | Khawand | |
| 2021/0105356 A1* | 4/2021 | Yu | G06F 3/0482 |
| 2021/0152685 A1* | 5/2021 | Li | G06F 3/0484 |
| 2021/0181923 A1* | 6/2021 | Luo | G06F 3/04883 |
| 2022/0277396 A1* | 9/2022 | Pariseau | H04L 67/55 |

(Continued)

FOREIGN PATENT DOCUMENTS

| | | |
|---|---|---|
| KR | 10-1706474 | 2/2017 |
| KR | 10-2017-0112249 | 10/2017 |
| KR | 10-2021-0000869 | 1/2021 |

OTHER PUBLICATIONS

Lo et al., Intelligent Display Auto-lock Scheme for Mobile Devices, 2015, IEEE, 7 pages (Year: 2015).*

*Primary Examiner* — Linh K Pham

(57) ABSTRACT

In one embodiment, a method may include determining one or more of (1) an amount of use of a display screen of a user's client computing device during a period of time, or (2) a frequency of unlocks of the display screen during the period of time. The method may include displaying, on a lock screen of the client computing device, one or more of: (1) the amount of use of the display screen during the period of time, or (2) the frequency of unlocks of the display screen during the period of time.

20 Claims, 3 Drawing Sheets

(56) References Cited

U.S. PATENT DOCUMENTS

| | | | | |
|---|---|---|---|---|
| 2022/0365669 | A1* | 11/2022 | de Vries | G06F 3/0485 |
| 2023/0110015 | A1* | 4/2023 | Liu | H04M 1/724631 |
| | | | | 726/26 |
| 2023/0298235 | A1* | 9/2023 | Zhang | G06F 9/451 |
| | | | | 345/629 |
| 2023/0300240 | A1* | 9/2023 | Fan | G06F 3/0481 |
| | | | | 455/411 |
| 2023/0308538 | A1* | 9/2023 | Caro | H04M 1/72424 |
| 2023/0367452 | A1* | 11/2023 | Graham | G06F 9/4418 |
| 2023/0393864 | A1* | 12/2023 | Kent | G06F 3/04847 |
| 2024/0069936 | A1* | 2/2024 | Zhang | G06V 40/16 |
| 2024/0105114 | A1* | 3/2024 | Zhou | G06F 1/3265 |

\* cited by examiner

100

Determining one or more of (1) an amount of use of a display screen of a user's client computing device during a period of time, or (2) a frequency of unlocks of the display screen during the period of time
110

↓

Displaying, on a lock screen of the client computing device, one or more of: (1) the amount of use of the display screen during the period of time, or (2) the frequency of unlocks of the display screen during the period of time
120

Fig. 1

DISPLAYING DEVICE-USAGE INFORMATION

TECHNICAL FIELD

This disclosure generally relates to displaying content on a client computing device.

BACKGROUND

A client computing device often includes a display screen for viewing content and interacting with the client computing device. For example, a smartphone, smartwatch, personal computer, tablet, and the like all include a display screen. Like many other hardware components of a client computing device that draw power, a display screen is typically not always powered on, but rather undergoes some duty cycling between (1) one or more active modes while a user is viewing content on the client computing device and (2) one or more inactive modes when a user has not interacted with the display for a period of time (e.g., one minute) or has intentionally deactivated the display, such as by closing the lid of a laptop or depressing a power button on a smartphone. When transitioning a display from an inactive mode (such as a sleep mode) to an active mode, a client computing device often displays an initial screen, such as a lock screen, to the user.

BRIEF DESCRIPTION OF THE DRAWINGS

FIG. 1 illustrates an example method for displaying device-usage information to a user.

DESCRIPTION OF EXAMPLE EMBODIMENTS

Figure 2:
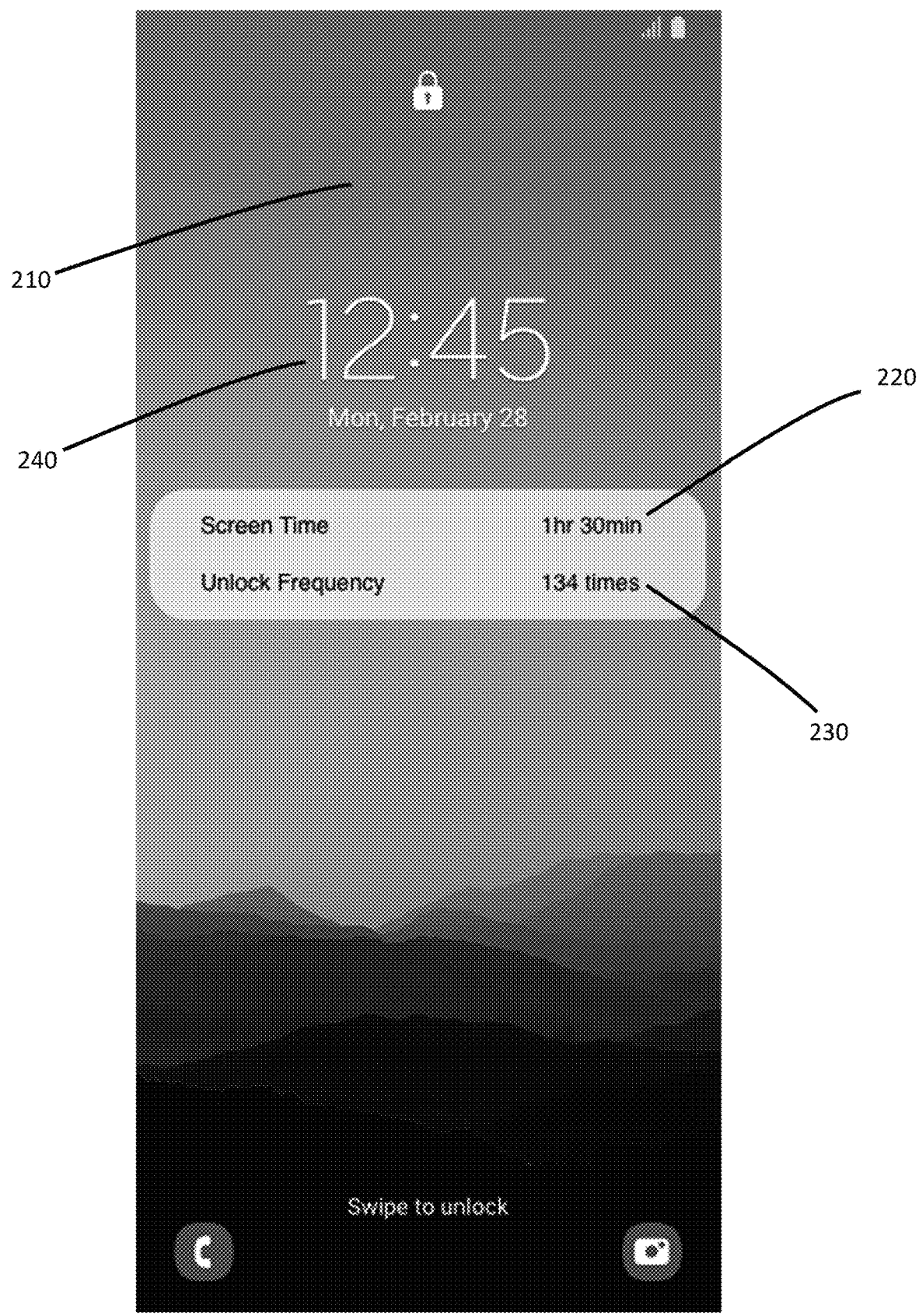
FIG. 2 illustrates an example lock screen displaying device-usage information.

Client computing devices provide many benefits such as access to information, access to applications, and ways to connect with others. However, for some users, client computing devices may be distracting. For example, a user attempting to focus on work may be distracted by their client computing device, such as notifications that occur on the client computing device or due to the presence of the device itself and the variety of experiences the device offers. For some users, certain usage of client computing devices may increase stress, decrease productivity, and/or disrupt sleeping patterns. Users may engage in repeated behaviors such as unlocking their smartphone or accessing applications when they otherwise should focus, sleep, or do something other than use their device. For many users, one problem is that they are not aware of their overall or repeated usage of their client device, and awareness may decrease distracting usage, or other sub-optimal usage, of a client computing device. For example, a user who is informed and aware of their device usage, such as total amount of device usage or frequency of usage, may use their device less frequently or in less disruptive ways, resulting in decreased stress or tiredness and increased productivity. However, a user may not experience these benefits even if device usage information is available to them, because the user may not seek out that information (in part, for example, because the user may not be aware of their device usage and so not think to seek out that information), or because the user may need to engage in distracting or disruptive behavior (such as unlocking their device and opening an application on their device) in order to view that information.

FIG. 1 illustrates an example method 100 for displaying device-usage information to a user. The example method 100 may begin at step 110, which may include determining an amount of use of a display screen of a user's client computing device, such as a mobile device, a wearable device, a personal computer, or any other suitable client computing device. In addition, or the alternative, step 110 of method 100 may include determining a frequency of unlocks of a display screen of the client computing device. Either or both of the use of the display screen of the client computing device or the frequency of unlocks of the client computing device may be determined over a particular period of time. For example, an amount of use may be determined over a period of a day, with the use counter restarting at a particular time such as midnight of the user's local time. As another example, an amount of use of the display screen may be determined over a rolling period, such as a rolling 24-hour period or a rolling 12-hour period. In particular embodiments, the time period may be set by a user of the client computing device, by hardware or software executing on the client computing device, by another computing device, or any suitable combination thereof.

In particular embodiments, an amount of use of the display screen of the client computing device refers to times in which the display screen is active, i.e., is displaying content on the screen. In particular embodiments, use is determined when the display screen is both unlocked and displaying content. In particular embodiments use of the display screen may also or alternatively depend on contextual information, such as a determination that the display screen is unlocked, displaying content, and that a user is viewing the content, which may include identifying the user (e.g., using facial-recognition techniques) and/or by identifying that the user is looking at or toward the screen (e.g., using gaze-recognition or eye-tracking techniques).

As the above example illustrates, an amount of use or an unlock frequency of a display screen may be user-dependent. For example, if a device may be shared between users, then a particular user's identity may be determined (e.g., by associating the user's identity with biological data such as their face, fingerprint, etc. or with identifying data such a user's access code to access the device) and display-screen use may be tracked separately for each user. In particular embodiments, display-screen use may be aggregated or may be user-independent.

As used herein, a "lock screen" generally refers to the screen of a powered-on client computing device that is first presented to the user after periods of inactivity or lack of interaction with the client computing device. For example, FIG. 2 illustrates an example lock screen 210 of client computing device 200. For example, a client computing device may be a smartphone and the lock screen may be the initial screen provided to a user when the user interacts with the booted-up client computing device from a black screen, such as by pressing the power button or by interacting with a touch-sensitive area of a display screen of the client computing device. As illustrated in FIG. 2, a lock screen may provide basic information such as a time of day and/or may present notifications from applications executing on the client computing device, and the lock screen may be a gateway to further interactions with the client computing device. As another example, a lock screen may be a screen displayed to a user of a personal computing device, such as a laptop, when the user interacts with an input device, such as a keyboard or mouse, when the personal computing is, e.g., asleep. As the name "lock screen" may suggest, a lock screen is often presented to the user in connection with access restrictions to content on the client computing device. For example, a user may need to provide user-identifying information, such as a passcode, fingerprint, facial ID, etc., in order to access content on a display of the client computing device, such as access to applications running on the client computing device or access to data stored on, or accessible by, the client computing device. However, in particular embodiments, this disclosure contemplates that access restrictions may not be associated with a "lock screen" as that term is used herein. For example, a smartphone may present an initial screen after periods of display inactivity, and the user may simply need to swipe on a touch-sensitive display of the device or press a button to access the smartphone's content. Moreover, after periods of display inactivity a device may initially present a screen from which applications or content may typically be accessed, such as a home screen, and this disclosure contemplates displaying, in particular embodiments, the amount of use or frequency of unlocks on such initially presented screens.

In particular embodiments, method 100 may at step 110 determine a frequency of unlocks of the display of the client computing device. As explained above with reference to determining the amount of use of a display screen, a frequency of unlocks of the display of the client computing device may be determined over a particular period of time. In particular embodiments, for the purposes of determining a frequency of display unlocks of a client computing device, the frequency may be the number of unlocks per unit period of time, which may be the entire period of time or a subset thereof, such as a frequency of unlocks per hour, per day, per minute, etc.

In particular embodiments, each unlock of the display of the client computing device may be counted for the purposes of determining a frequency of unlocks. In particular embodiments, an unlock may be actually unlocking a display of a device such as, e.g., by providing access credential to access content on the client device. In particular embodiments, an unlock may include moving past an initial lock screen even if access credentials are not required to access content on the device, for example if content can be accessed simply by swiping on touch-sensitive display showing the lock screen.

In particular embodiments, method 100 may count unlocks over a particular period of time as a single unlock. For example, if a user unlocks their device, accidentally locks the device, and then unlocks the device again, if the two unlocks are performed with a period of time then the two unlocks may be counted a single unlock. The period of time may be, e.g., 10 or 15 second, half a minute, one minute, or any other suitable period of time. In particular embodiments, as explained above, each unlock may be counted for determining a frequency of unlocks of the display screen of the client computing device.

In particular embodiments, screen-time usage and/or unlocks may be tracked by the client computing device being used or unlocked. For example, an input/output (I/O) interface or system services of the operating system executing on the client computing device may track the state of a display, such as whether the display is in an active mode currently displaying content. In addition, systems services of an operating system executing on the client computing device may track the state of a lock screen, such as whether the lock screen is currently active. Data from these system and device resources can be obtained, such as for example by using an API or SDK providing access to such resources, and therefore data such as screen-time usage and/or unlock frequency can be determined based on, e.g., a counter that run when the screens is active and a counter that tracks changes in the lock-screen state, respectively.

At step 120, method 100 may include one or more of (1) displaying, on the lock screen of the client computing device, the amount of use of the display screen or (2) the frequency of unlocks of the display screen that were determined in step 110. FIG. 2 illustrates an example client computing device 200 displaying on lock screen 210 an amount of use of the display screen of client device 200 over a period of time (shown in FIG. 2 as screen-usage element 220) and also displaying the unlock frequency over a period of time (shown in FIG. 2 as unlock-frequency element 230, which in this example shows a total number of unlocks during the period of time but, as described herein, may be shown in other formats). In particular embodiments, as shown in FIG. 2, screen-usage element 220 and unlock-frequency element 230 may be shown on lock screen 210 near and below other informational content that typically appears on lock screen 210, such a content 240 displaying the time. In particular embodiments, the location of elements 220 or 230 may change as additional content is displayed on lock screen 210, e.g., by moving elements 220 and 230 down when notifications from applications executing on device 200 appear on lock screen 210. In particular embodiments, the location and other aspects of the graphical appearance of elements 220 and 230, such as the size or font used to display those elements, may be selected by a user.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof. Moreover, as the example method of FIG. 1 surfaces device-usage information to a user in an immediately accessible manner and without requiring the user to seek out such device-usage information, the method of FIG. 1 provides a user with the awareness of their device-usage information, which can result in decreased disruptive usage of the device and increased productivity, decreased stress, etc.

In particular embodiments, a user may determine whether to display screen-usage or unlock-frequency information on the lock screen of the user's client device. For example, one or more settings within an application, such as a health-related application or a system-settings application, may be used to toggle on or off the presentation of screen-usage information and/or unlock-frequency information. In particular embodiments, the presentation of such elements may be independently toggled such that one, both, or neither of those elements may be set to appear on the lock screen of the client computing device.

In particular embodiments, an application, such as system settings or a health-related or productivity-related application, may include additional information or options regarding screen usage and unlock frequency. For example, an application may display the user's progress toward a threshold for screen usage and/or a threshold for unlock frequency, as explained more fully herein. For example, the application may show a progress bar that displays the user's current screen usage, the user's threshold usage, and an indication of the user's relative usage compared to the threshold. An application may additionally or in the alternative display information about a user's thresholds, the applications or screens used in determining screen usage or unlock frequency, the time period over which these quantities are calculated, or any suitable combination thereof.

In particular embodiments, a user's screen usage over a period of time may be associated with a screen-usage threshold for that period of time. Likewise, a user's unlock frequency over a period of time may be associated with an unlock-frequency threshold over the period of time. Such thresholds may identify or indicate the maximum screen usage or unlock frequency, respectively, that should or can occur over the period of time. Thresholds may be turned on or off by a user, for example as part of application settings described more fully herein, and threshold values may be set by a user. In particular embodiments, threshold values may be determined automatically, e.g., by being preset on the user's client computing device, by averaging past usage or unlock data for the user, based on expert recommendations such as medical recommendations, by averaging usage or unlock data for other users such as similar users, or any suitable combination thereof. In particular embodiments, such threshold values may be shown to the user with, in some embodiments, an explanation of the source of the value, such as an explanation that the value corresponds to a medical recommendation.

In particular embodiments, certain functionality may automatically occur when a user's screen usage or unlock frequency reaches a threshold or reaches a certain value based on the threshold, such as a percentage of the threshold. For example, screen-usage element 220 may appear on lock screen 210 when a user's screen usage reaches a corresponding threshold, or reaches a certain percentage of that threshold. As another example, one or more graphical enhancements may be provided to displayed screen usage or unlock frequency, or both, based on their values relative to corresponding thresholds. For example, screen-usage element 220 may be presented in a first color, such as grey or white text, when screen usage is less than the threshold value, and may be presented in a different color, such as red text, when screen usage meets or exceeds the threshold value. Thus, the display of the computing device can elegantly communicate to a user both total screen usage over a period of time and screen usage in relation to a preexisting threshold. In particular embodiments, changes to the color or intensity of content displayed on the display screen, such as changing background images of the lock screen or home screen to greyscale, may occur when one or more thresholds are reached.

In particular embodiments, there may be gradations of graphical enhancements based on screen usage or unlock frequency relative to the threshold. For example, screen-usage element 220 may appear grey or white when less than 50% of a corresponding threshold, may appear, e.g., 80% white mixed with 20% red when screen usage is above 50% of the threshold but less than 75% of the threshold, may appear 50% red when screen usage is above 75% of the threshold but less than 100% of the threshold, and may appear 100% red when screen usage meets or exceeds the threshold. While the preceding examples use color as a graphical enhancement, this disclosure contemplates other suitable enhancements such as increased opacity, increase size, increased motion, increased emphasis such as bolding, underlining, or the like, or any suitable combination thereof. Moreover, while the examples above refer to screen-usage element 220, this disclosure contemplates that graphical enhancements may similarly be applied to unlock-frequency information, such as unlock-frequency element 220 displayed on lock screen 210.

In particular embodiments, when screen usage or unlock frequency reaches a threshold or a particular amount of progress toward a threshold, certain functionality may be provided or disabled. For example, one or more notifications may be provided to a user when their screen usage reaches, e.g., 75%, 90%, and/or 100% of their corresponding thresholds. In particular embodiments, access to certain applications or content on the user's client computing device (or, in particular embodiments, across client computing devices when screen usage and/or unlock frequency information is communicated to or shared by more than one client computing device) may change based on screen usage or unlock frequency values with respect to their corresponding thresholds. For example, when a user's screen usage reaches a corresponding threshold, then the user's access to certain applications, such as games, video-playing applications, social applications, and/or web browser applications or certain websites or domains accessible by a web-browser, may be restricted or disabled for a period of time, for example until the period of time used to determine screen usage (such as described in connection with step 110 of example method 100) resets or until the value of screen usage over a rolling period falls below the corresponding threshold.

In particular embodiments, a user's access to applications may not be restricted or disabled when a threshold is reached, but a notification may be provided to the user, such as on a display of a client device when the user is attempting to access an application (e.g., a game application), reminding the user that screen usage has met or exceeded a threshold. In particular embodiments, a notification may be provided to a user that encourages or suggests some activity when screen usage or unlock frequency meets or exceeds a threshold, such as taking a break from a client computing device or performing some activity such as meditation, etc.

In particular embodiments, a user may select which applications or content will have modified access and/or what kind of access modifications to create when screen usage meets or exceeds a threshold. For example, an application such as a system-settings application as described above may receive and store user input identifying which content to receive access restrictions and what restrictions those may be.

While the examples above describe access modification or notifications in connection with thresholds for screen usage, this disclosure contemplates that access modifications may similarly be used for thresholds corresponding to unlock frequency. For example, when a threshold for unlock frequency is reached, access to applications such as those described above may be modified until unlock frequency falls below the threshold, or until the period of time for calculating unlock frequency resets. As another example, when a threshold for unlock frequency is reached, additional unlock attempts may be restricted or modified, such as by providing a notification to a user when an unlock attempt is made; and likewise, when a screen-usage threshold is reached, then attempts to move past a lock screen may be limited or restricted.

In particular embodiments, the steps of example method 100 may be performed for a user across one or more of the user's devices. For example, if a user has a smartphone and a tablet, aggregate screen-time usage, frequency of unlocks, or both may be determined based on the combining data from the two separate devices. In particular embodiments, the steps of example method 100 may be performed for a particular device. In particular embodiments, a user may choose whether the steps of example method 100 are applied to more than one device, and may select which devices to apply such a method to.

In particular embodiments, only particular applications or particular displays may be included when determining the display usage information such as, e.g., in step 110 of method 100 of FIG. 1. For example, an application or website that is used for work or school purposes, such as a word-processing application, spreadsheet application, or presentation application, may not be included in screen-usage data, such that using such applications would not increase the screen-usage counter. As another example, using a medical application, such as an application for reducing stress or receiving medical treatment, may not be included in screen-usage data. As another example, accessing content on a web browser on a particular domain, such as an employer's or school's domain, may not be included in screen usage information.

In particular embodiments, applications or particular screens included in screen-usage information may vary based on time. For example, productivity applications may not be counted for screen-usage purposes when used during a workday during work hours while a user is trying to be productive and reduce distractions from productivity, but may be counted if accessed, for example, late in the evening, when a user may be trying to reduce stress or prepare for sleep. In particular embodiments, the applications, screens, and/or times included or excluded from usage may be selected or specified by a user, such as for example within application or system settings described more fully herein. In particular embodiments, the applications, screens, and/or times included or excluded from usage may be selected or specified by another entity, such as an employer or a medical professional. In particular embodiments, the applications, screens, and/or times included or excluded from usage may be automatically determined based on a user's goal, such as "reducing stress" or "improving productivity," and such goals may vary based on, e.g., time of day or day or the week.

In particular embodiments, contextual information may be used to determine whether to display screen-usage or unlock frequency information to a user, may be used to determine or adjust thresholds, may be used to modify access to applications or content, and/or may be used to determine whether to send related notifications to a user. For example, a user's health-related conditions such as stress, sleep, or tiredness may be estimated, for example based on biological measurements (e.g., cardiovascular measurements, respiration measurements, etc.) made by, e.g., a wearable device or other client computing device of the user. For example, a user's stress may be estimated, and a threshold for screen-time usage or unlock frequency may be lowered as the estimated stress level increases. As another example, a user's tiredness may be estimated, for example based on the user's recent sleep history or by using facial-recognition methods to estimate a level of tiredness based on the user's current facial appearance, and one or more thresholds may be reduced as such estimated tiredness increases. As another example, in particular embodiments a time of day may be contextual information that can be used. For example, unlock frequency or screen-time usage may be displayed on a lock screen during the evening or within a predetermined time of the user's typical bedtime, or display of such information may be emphasized based on the time of day. As another example, in particular embodiments an amount of light in the environment of a user's client device may be detected and used to determine whether to display screen-usage or unlock frequency information (or both) for a user. For example, when the device detects that an amount of illumination (e.g., in the visible spectrum) is currently below a particular threshold, which may correspond to a user turning off lights to go to sleep, then the device may display screen-usage or unlock-frequency information on a lock screen of the display. The threshold may be set by a user, may be determined automatically, or may be preset on the client computing device. In particular embodiments, the time of day may be used along with light level to determine whether to display screen-usage or unlock-frequency information (or both) to the user. For example, a user's bedtime may be set by a user or may be determined based on the user's previous behavior, and when it is later than the user's bedtime and the light in the environment of the client device is below a threshold level then the device may display screen-usage or unlock-frequency information (or both) on a lock screen of the device.

Figure 3:
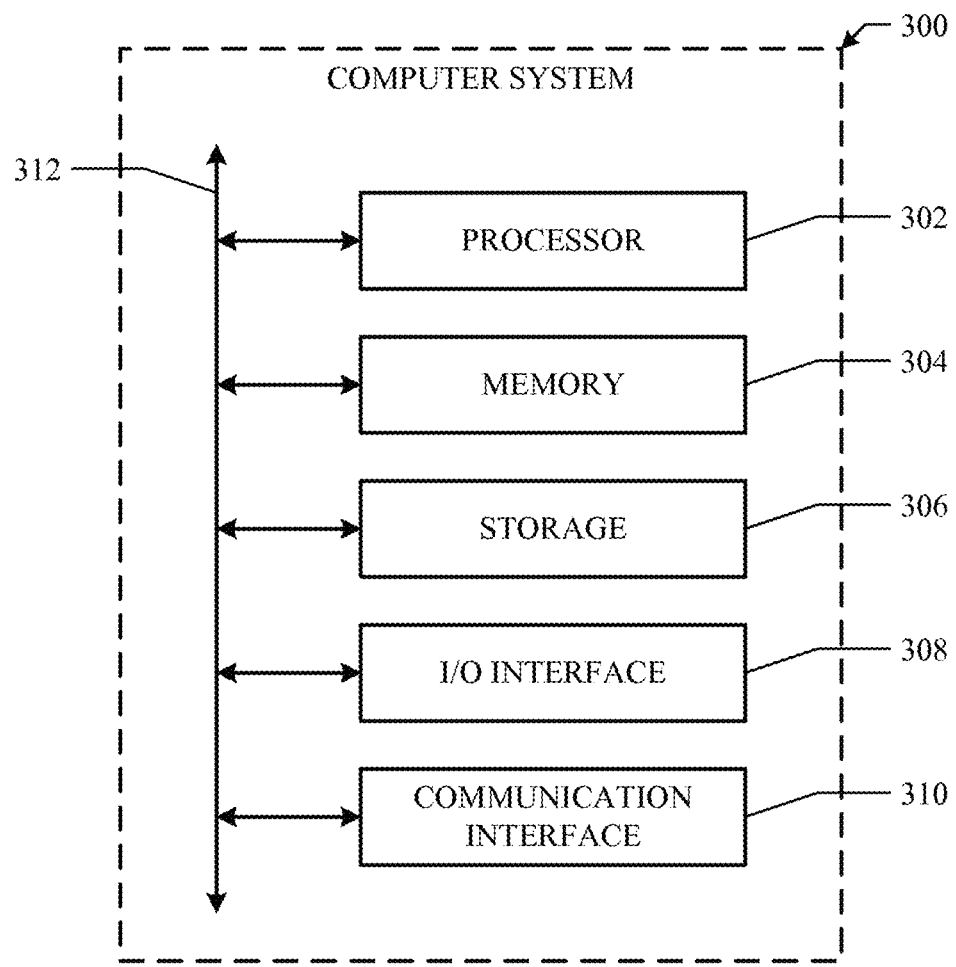
FIG. 3 illustrates an example computing device.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. The operating system can be stored on the HDD or other types of storage 306. System services of the operating system executing on the processor 302 or an input/output (I/O) interface 308 may track the state of a display, such as whether the display is in an active mode currently displaying content. In addition, systems services of an operating system executing on the processor 302 may track the state of a lock screen, such as whether the lock screen is currently active. Data from these system and device services can be obtained, such as for example by using an API or SDK providing access to such services, and therefore data such as screen-time usage and/or unlock frequency can be determined based on, e.g., a counter that run when the screens is active and a counter that tracks changes in the lock-screen state, respectively. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   determining, by one or more processors, one or more of:
      an amount of use of a display screen of a user's client computing device during a period of time, or a frequency of unlocks of the display screen during the period of time; and
   displaying, on a lock screen of the client computing device, one or more of: the amount of use of the display screen during the period of time, or the frequency of unlocks of the display screen during the period of time.

2. The method of claim 1, further comprising displaying, on the display screen, a graphical element configured to enable or disable display of the amount of use of the display screen or of the frequency of unlocks of the display screen.

3. The method of claim 1, wherein the lock screen displays a time of day, and the method further comprises displaying, below the time of day displayed on the lock screen, one or more of:
   the amount of use of the display screen during the period of time or the frequency of unlocks of the display screen during the period of time.

4. The method of claim 1, further comprising:
   comparing one or more of: the amount of use of the display screen to a corresponding screen-usage threshold, or the frequency of unlocks of the display screen to a corresponding unlock-frequency threshold; and
   one or more of:
      in response to a determination that the amount of use of the display screen exceeds the screen-usage threshold, providing a graphical enhancement of the amount of use of the display screen displayed on the lock screen; or
      in response to a determination that the frequency of unlocks of the display screen exceeds the unlock-frequency threshold, providing a graphical enhancement of the frequency of unlocks of the display screen displayed on the lock screen.

5. The method of claim 4, wherein the graphical enhancement comprises modifying one or more of: a size of a font, a color, or a transparency.

6. The method of claim 4, wherein one or both of the screen-usage threshold and the unlock-frequency threshold are adjustable by the user of the client computing device.

7. The method of claim 4, further comprising modifying an accessibility of at least some content on the client computing device in response to a determination that one or more of:
  the amount of use of the display screen exceeds the screen-usage threshold; or
  the frequency of unlocks of the display screen exceeds the unlock-frequency threshold.

8. The method of claim 7, wherein modifying the accessibility of the at least some content on the client computing device comprises one or more of:
  disabling access to one or more application on the client computing device;
  providing one or more notifications to the user of the client computing device when the user attempts to access one or more applications; or
  reducing a number or frequency of notifications provided from one or more applications to the user of the client computing device.

9. The method of claim 4, wherein one or more of the screen-usage threshold or the unlock-frequency threshold are based at least in part on a context.

10. The method of claim 9, wherein the context comprises one or more of: an estimate of how tired the user is, an estimate of the user's stress level, or a time of day.

11. A system comprising one or more processors and one or more non-transitory computer readable storage media embodying instructions and coupled to the one or more processors, the one or more processors operable to execute the instructions to:
  determine one or more of: an amount of use of a display screen of a user's client computing device during a period of time, or a frequency of unlocks of the display screen during the period of time; and
  display, on a lock screen of the client computing device, one or more of: the amount of use of the display screen during the period of time, or the frequency of unlocks of the display screen during the period of time.

12. The system of claim 11, wherein the one or more processors are further operable to execute the instructions to display, on the display screen, a graphical element configured to enable or disable display of the amount of use of the display screen or of the frequency of unlocks of the display screen.

13. The system of claim 11, wherein the lock screen displays a time of day, and the one or more processors are further operable to execute the instructions to display, below the time of day displayed on the lock screen, one or more of: the amount of use of the display screen during the period of time or the frequency of unlocks of the display screen during the period of time.

14. The system of claim 11, wherein the one or more processors are further operable to execute the instructions to:
  compare one or more of: the amount of use of the display screen to a corresponding screen-usage threshold, or the frequency of unlocks of the display screen to a corresponding unlock-frequency threshold; and
  one or more of:
    in response to a determination that the amount of use of the display screen exceeds the screen-usage threshold, provide a graphical enhancement of the amount of use of the display screen displayed on the lock screen; or
    in response to a determination that the frequency of unlocks of the display screen exceeds the unlock-frequency threshold, provide a graphical enhancement of the frequency of unlocks of the display screen displayed on the lock screen.

15. The system of claim 14, wherein the graphical enhancement comprises modifying one or more of: a size of a font, a color, or a transparency.

16. One or more non-transitory computer readable storage media embodying instructions and coupled to one or more processors that are operable to execute the instructions to:
  determine one or more of: an amount of use of a display screen of a user's client computing device during a period of time, or a frequency of unlocks of the display screen during the period of time; and
  display, on a lock screen of the client computing device, one or more of: the amount of use of the display screen during the period of time, or the frequency of unlocks of the display screen during the period of time.

17. The media of claim 16, wherein the one or more processors are further operable to execute the instructions to display, on the display screen, a graphical element configured to enable or disable display of the amount of use of the display screen or of the frequency of unlocks of the display screen.

18. The media of claim 16, wherein the lock screen displays a time of day, and the one or more processors are further operable to execute the instructions to display, below the time of day displayed on the lock screen, one or more of: the amount of use of the display screen during the period of time or the frequency of unlocks of the display screen during the period of time.

19. The media of claim 16, wherein the one or more processors are further operable to execute the instructions to:
  compare one or more of: the amount of use of the display screen to a corresponding screen-usage threshold, or the frequency of unlocks of the display screen to a corresponding unlock-frequency threshold; and
  one or more of:
    in response to a determination that the amount of use of the display screen exceeds the screen-usage threshold, provide a graphical enhancement of the amount of use of the display screen displayed on the lock screen; or
    in response to a determination that the frequency of unlocks of the display screen exceeds the unlock-frequency threshold, provide a graphical enhancement of the unlock frequency of unlocks of the display screen displayed on the lock screen.

20. The media of claim 19, wherein the graphical enhancement comprises modifying one or more of: a size of a font, a color, or a transparency.

* * * * *